US006788543B2

(12) United States Patent
Yanagida

(10) Patent No.: US 6,788,543 B2
(45) Date of Patent: Sep. 7, 2004

(54) INFORMATION PROCESSING APPARATUS WITH FRONT COVER

(75) Inventor: Atsuhiro Yanagida, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 10/225,174

(22) Filed: Aug. 22, 2002

(65) Prior Publication Data

US 2003/0053291 A1 Mar. 20, 2003

(30) Foreign Application Priority Data

Sep. 20, 2001 (JP) ........................................ 2001-287655

(51) Int. Cl.[7] ................................................ H05K 7/16
(52) U.S. Cl. ................ 361/727; 312/223.3; 364/708.1; 248/553; 292/148
(58) Field of Search ................................ 361/724–727, 361/683–687; 312/223.1–223.6; 364/708.1; 248/551–553; 292/42, 148, 152

(56) References Cited

U.S. PATENT DOCUMENTS

| 5,557,499 | A | | 9/1996 | Reiter et al. ................. 361/685 |
| 5,598,319 | A | * | 1/1997 | Lee ............................. 361/684 |
| 5,768,098 | A | * | 6/1998 | Murayama .................. 361/684 |
| 6,437,976 | B1 | * | 8/2002 | Wolff et al. ................. 361/683 |

* cited by examiner

Primary Examiner—Hung Van Duong
(74) Attorney, Agent, or Firm—Finnegan, Henderson, Farabow, Garrett & Dunner, L.L.P.

(57) ABSTRACT

An information processing apparatus comprises a main unit and a cover. The main unit has a slot formed in its surface and a cover mounting portion formed on the surface. An electronic device can be inserted into the main unit through the slot. The cover is located on the surface of the main unit so as to cover the slot. The cover has an end portion disposed on the cover mounting portion. The end portion is rockably attached to the cover mounting portion of the main unit by means of a hinge mechanism. The cover is detachable from the main unit.

6 Claims, 11 Drawing Sheets

INFORMATION PROCESSING APPARATUS WITH FRONT COVER

CROSS-REFERENCE TO RELATED APPLICATIONS

This application is based upon and claims the benefit of priority from the prior Japanese Patent Application No. 2001-287655, filed Sep. 20, 2001, the entire contents of which are incorporated herein by reference.

BACKGROUND OF THE INVENTION

1. Field of the Invention

The present invention relates to an information processing apparatus, capable of being loaded with an electronic device and having an openable cover on its surface.

2. Description of the Related Art

In order to secure a high throughput, an information processing apparatus, such as a server that handles large-capacity data, is designed so that a plurality of hard disc drives can be set in its main unit.

In the server, a slot for electronic devices is formed in the surface (e.g. front face) of the main unit that contains various functional parts therein, in order to facilitate replacement, maintenance, and inspection of the hard disc drives. A passage extends from the slot into the main unit. A detachable hard disc drive can be slid deep into the main unit through the slot. By doing this, the hard disc drive (equivalent to an electronic device) can be set in the main unit.

For reliable security, the server is provided with a cover called a front bezel on the surface of the main unit. After the hard disc drive is set in place, the slot of the main unit is closed by means of the bezel. The bezel serves to prevent the hard disc drive from being recklessly drawn out of the main unit.

The bezel is large enough to cover the whole front face of the main unit including the slot. Thus, the bezel can prevent exposure of the various parts attached to the surface (front face) of the main unit, as well as the hard disc drive.

A plurality of main units are set on a plurality of racks in some cases, and one main unit is placed on a desk in other cases. In any case, the bezel is not expected to interfere with its surrounding objects or hinder the maintenance and inspection of the various parts that are attached to the front face of the main unit. Preferably, therefore, the bezel should be of a type such that it can be downwardly swung open around hinges on its lower edge portion.

More specifically, the lower end portion of the bezel and a cover mounting portion that is formed on the lower part of the front face of the main unit are coupled for rocking motion by means of the hinges. The hinges have an axis that extends along the front face of the main unit. The bezel can be swung around the axis from a vertical position in which it closes the slot to a horizontal position in which it leaves the slot open.

The server is expected to be mounted with hard disc drives with high density. To attain this, the hard disc drives should be located as close to the hinges as possible so that a lot of hard disc drives can be mounted in the main unit. However, the presence of the bezel is inconsistent with this requirement.

The bezel is constructed so that its lower end portion is rockably coupled to the lower part of the front face of the main unit by means of the hinges. When the bezel is open, the front face of the main unit is exposed wide, so that the maintenance and inspection of the main unit are easy. In order to replace a hard disc drive, the bezel sometimes may be opened so that the disc drive can be drawn out of or inserted into the slot.

If the hard disc drive is located near the hinges, it interferes with those parts of the bezel which are situated close to the hinges as it is slid, thereby hindering the replacing operation. Since various projections protrude from the inner surface of the bezel, moreover, the hard disc drive may possibly interfere with them.

Accordingly, the hard disc drives of the conventional server must inevitably be mounted in positions where they never interfere with the bezel including the hinges, projections, etc. In the conventional server, the hard disc drives cannot be located near the axis of the hinges. Thus, the limited space of the main unit cannot be utilized effectively, so that more hard disc drives cannot be mounted in the main unit.

BRIEF SUMMARY OF THE INVENTION

Accordingly, the object of the present invention is to provide an information processing apparatus in which more electronic devices can be mounted in a main unit without being influenced by a cover.

In an information processing apparatus according to the present invention, a cover that swingably attached to the surface of a main unit can be detached from the main unit. The cover is opened when an electronic device is to be inserted into and drawn out of the slot. Thereafter, the cover can be disengaged from the main unit. In this state, the electronic device can be replaced with a new one without interfering with the cover.

Since interference between the electronic device and the cover can be avoided in this manner, the slot for the device can be located closer to the axis of hinge mechanisms. Accordingly, those areas which are situated in close vicinity to the end of the surface of the main unit can be utilized as a space for storing the electronic device, so that the device can be mounted with high density.

Preferably, the hinge mechanism should be configured so that the open cover separates from the main unit when it is subjected to an excessive load in the direction to open it. According to this arrangement, the cover can be prevented from being damaged even in case it is accidentally opened with an excessive force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 11B.

Figure 1:
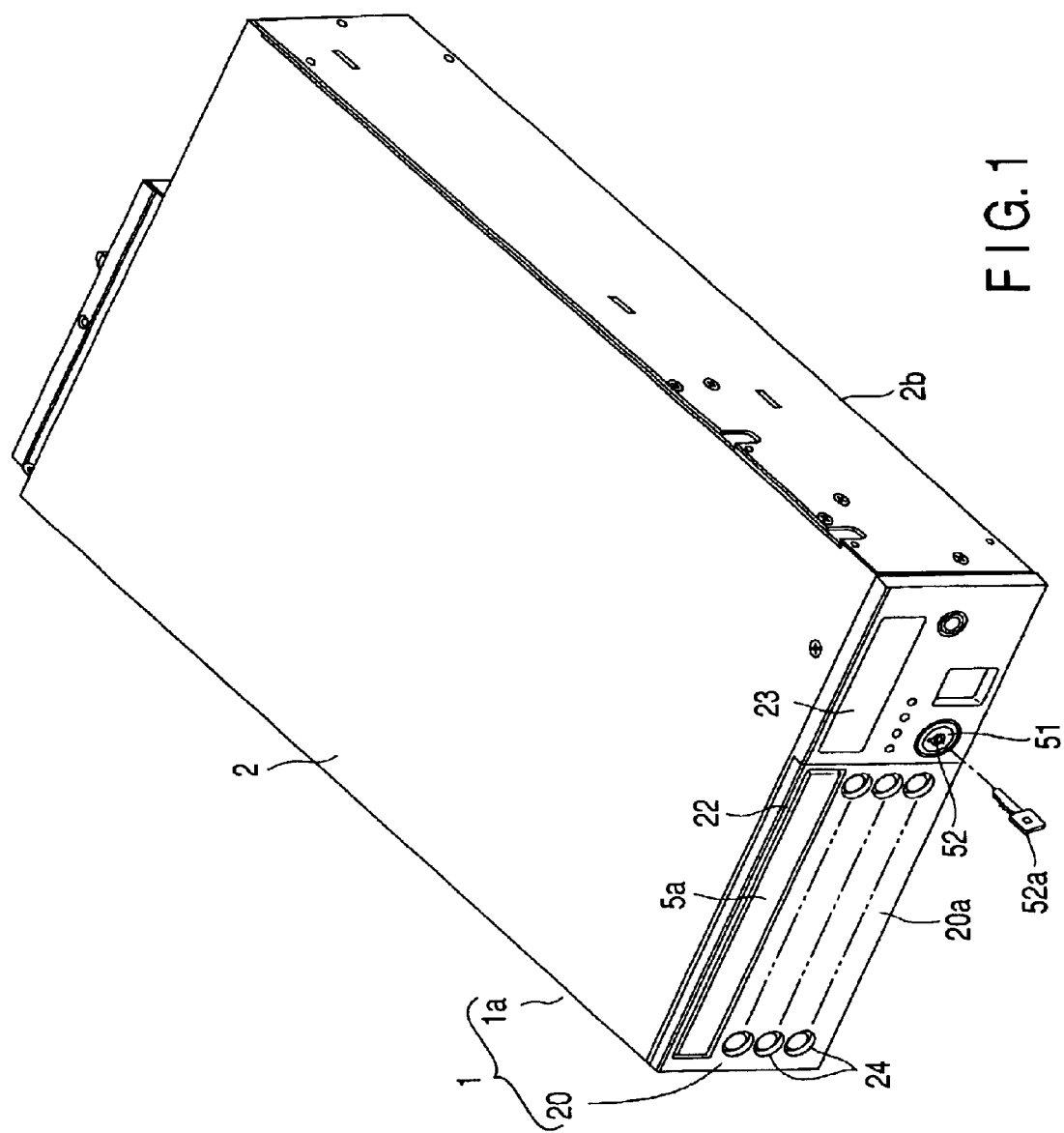
FIG. 1 is a perspective view of a server according to a first embodiment of the invention with its cover closed.

FIG. 1 shows an outline of a server 1 for use as an information processing apparatus. In the description of the server 1 to follow, the X-direction indicated by the arrow in FIG. 1 is regarded as the width direction of the server 1, and the Y-direction as the longitudinal direction of the server 1 for convenience.

Figure 2:
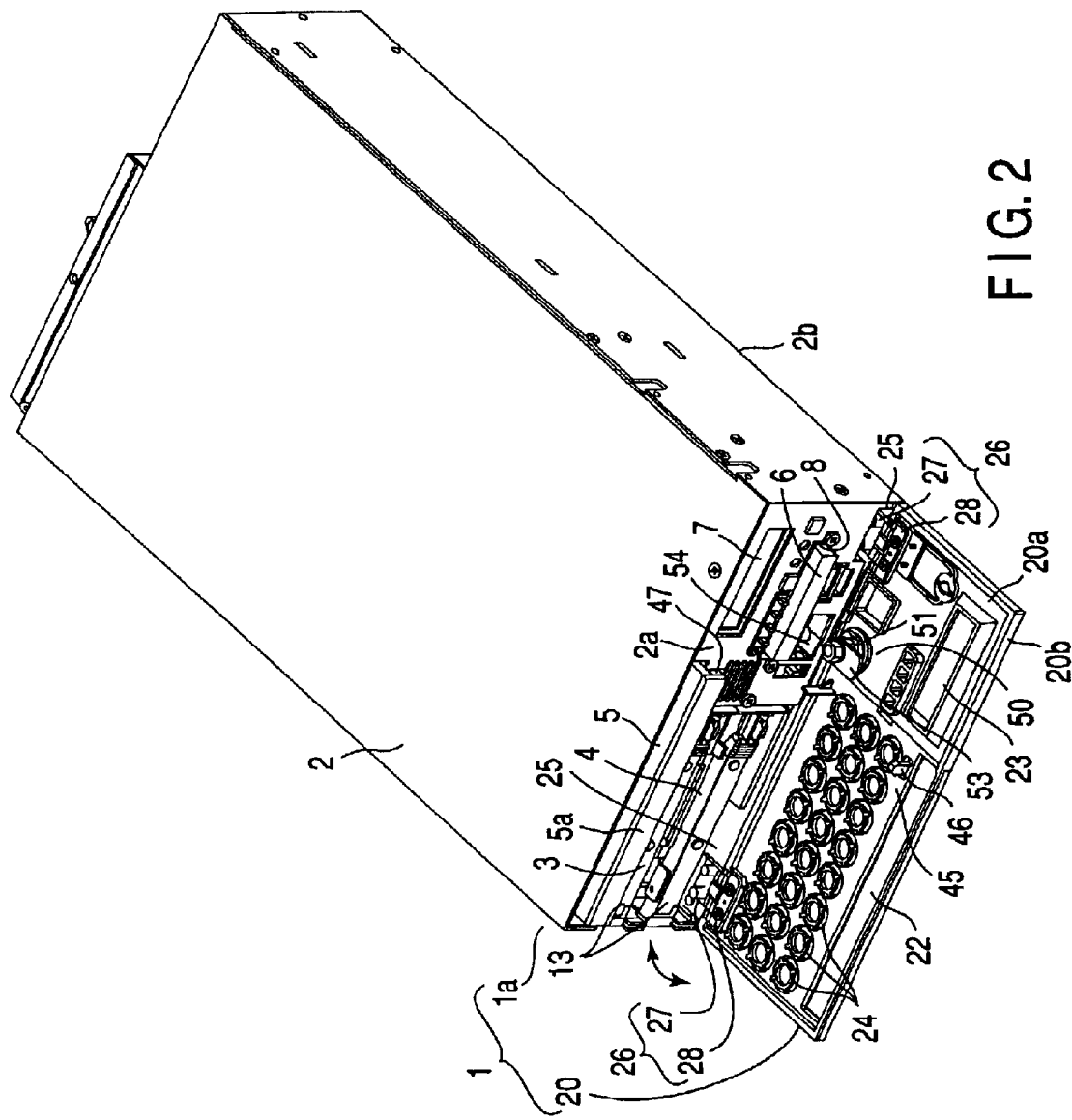
FIG. 2 is a perspective view of the server shown in FIG. 1 with its cover open.

As shown in FIG. 1, the server 1 comprises a main unit 1a. The main unit 1a has a metallic housing 2. As shown in FIG. 2, the housing 2 is in the form of a rectangular box that is elongated in the longitudinal direction. The housing 2 contains therein a motherboard (not shown) that is mounted with a memory (not shown), microprocessor (not shown), etc.

As shown in FIG. 2, electronic devices are attached to the front face or a front wall 2a as a surface of the housing 2. The electronic devices include two hard disc drives 3 and 4, CD-ROM drive 5, LAN card 6, and indicator 7, for example.

Figure 3:
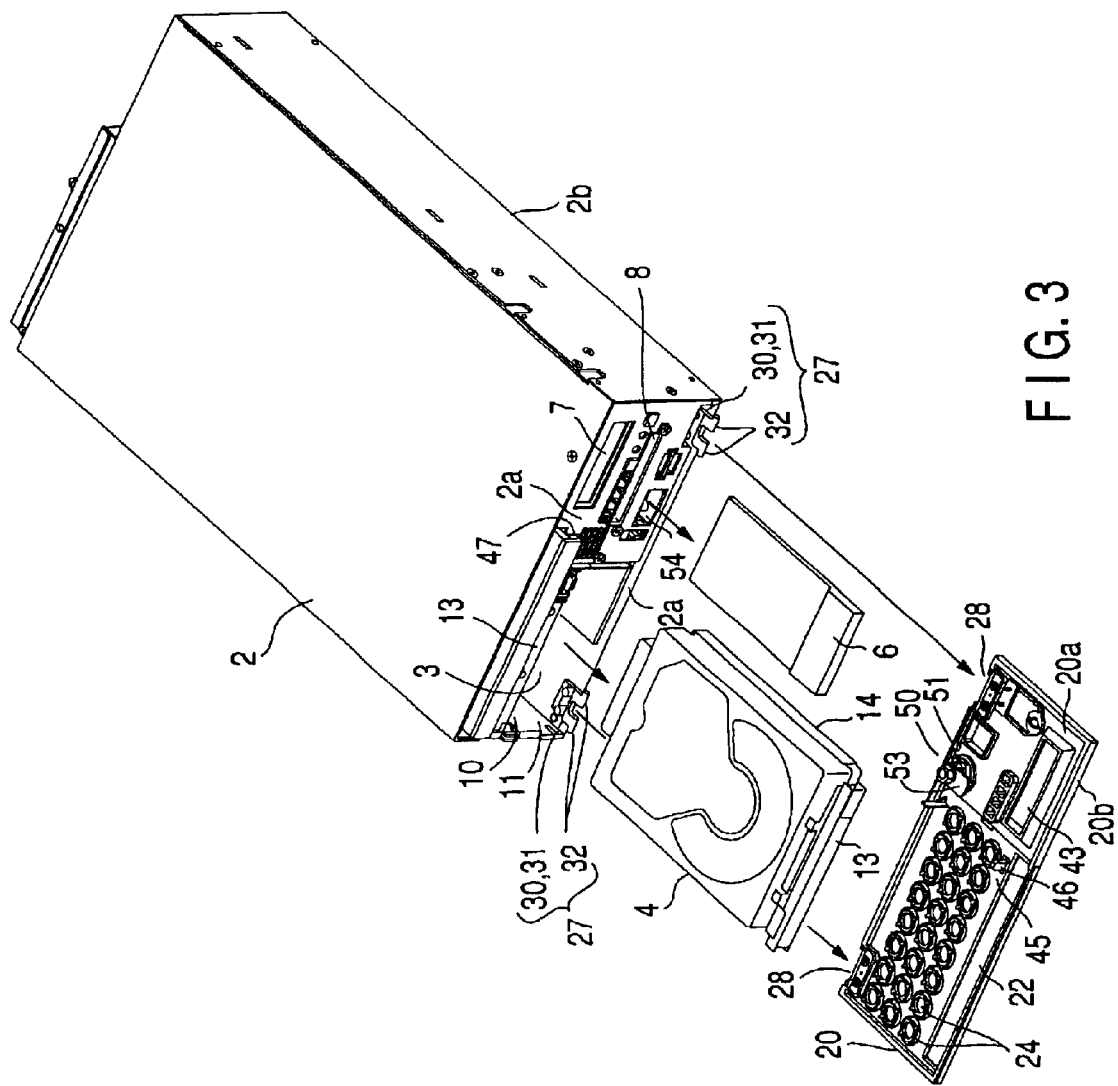
FIG. 3 is a perspective view of the server shown in FIG. 1 with its cover disengaged from its main unit.

As shown in FIG. 3, the LAN card 6 is removably inserted into a slot 8 that is formed on the right-hand side of the front wall 2a of the housing 2. The indicator 7 is mounted over the slot 8. The CD-ROM drive 5 is attached to the left-hand top portion of the front wall 2a. An example of the CD-ROM drive 5 is of a tray type such that a tray 5a projects forward.

The two hard disc drives 3 and 4 are removably inserted in upper and lower slots 10 and 11, respectively. In FIG. 3, the upper slot 10 and the upper hard disc drive 3 are shown only partially. The slots 10 and 11 are formed ranging from the region right under the CD-ROM drive 5 to a bottom wall 2b that forms the base of the housing 2. The slots 10 and 11 are equivalent to a slot according to the present invention.

As shown in FIG. 3, the hard disc drives 3 and 4 are modularized in a manner such that they are combined with the tray 5a that is fitted with loading/unloading levers 13. The hard disc drives 3 and 4 are inserted in the upper and lower slots 10 and 11, respectively. Guide rail portions (not shown) are formed on the inner surface of each of the slots 10 and 11. The hard disc drives 3 and 4 are guided along the guide rail portions as they are slid deep into the main unit 1a to be set therein.

Each of the hard disc drives 3 and 4 is provided with a connector portion 15 that is located in its inner part with respect to the direction of insertion. The connector portion 15 is connected to a connector portion (not shown) of a passage (not shown) that extends from each of the slots 10 and 11. As this is done, the hard disc drives 3 and 4 are connected electrically to the motherboard. Thus, the two hard disc drives 3 and 4 can be mounted in the main unit 1a by effectively utilizing a limited space that ranges from the region right under the CD-ROM drive 5 to the bottom wall 2b of the housing 2.

As shown in FIG. 1, a plastic front bezel 20 for use as a cover is located on the front of the main unit 1a or the front face of the housing 2 so as to shield the front face. The bezel 20 is composed of a body 20a in the form of a rectangular plate that overspreads the whole front face of the housing 2. The slots 10 and 11 are concealed under the bezel 20.

As shown in FIGS. 1 and 2, the bezel 20 is formed having a tray gate 22 and a transparent portion 23. The tray 5a of the CD-ROM drive 5 can be passed through the tray gate 22. The transparent portion 23 transmits light from the indicator 7 to the outside. A large number of vent holes 24 are formed in the bezel 20.

A rib 20b is formed on the outer periphery of the bezel 20 so that the peripheral portion of the bezel 20 is thicker than any other portion. As shown in FIG. 2, the left- and right-hand parts of the lower end portion of the bezel 20 are rockably supported on cover mounting portions 25 by means of hinge mechanisms 26, individually. The cover mounting portions 25 are formed on the front end of the main unit 1a, and more specifically, on the opposite sides, left and right, of the front edge portion of the bottom wall 2b, individually. In this embodiment, the cover mounting portions 25 are composed individually of a front edge portion of the bottom wall 2b that is located under the lower hard disc drive 11 and a front edge portion of the bottom wall 2b that is located under the slot 8.

As shown in FIGS. 3, 4, 7 and 8, each hinge mechanism 26 has a dual structure composed of first and second hinge portions 27 and 28. The first hinge portion 27 is fixed on each corresponding cover mounting portion 25. The second hinge portion 28 is fixed on each of the opposite side portions, left and right, of the lower end of the bezel 20 that correspond to the cover mounting portions 25, individually.

Figure 4:
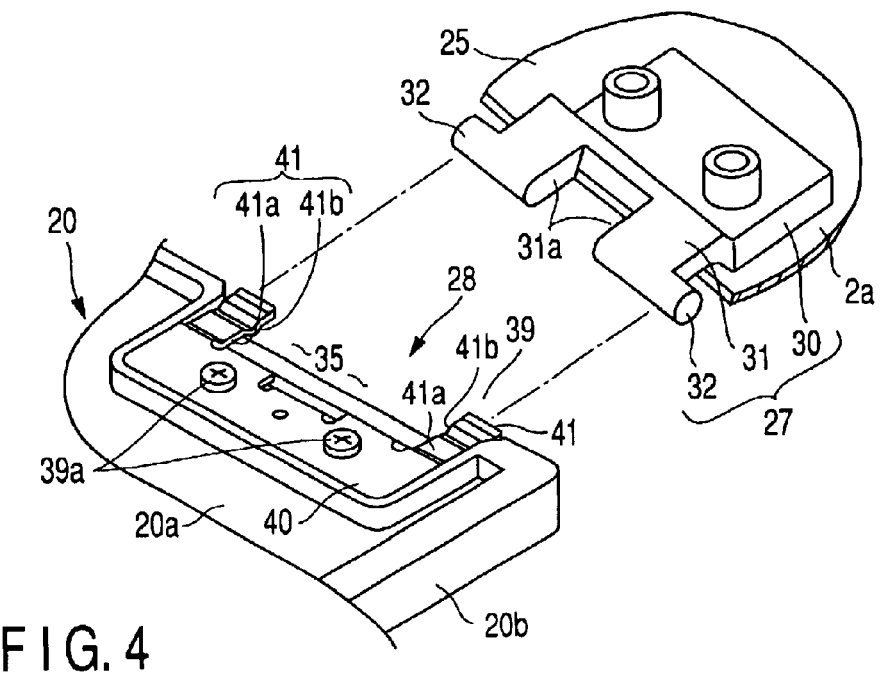
FIG. 4 is a perspective view showing a hinge mechanism of the server shown in FIG. 1.

Each first hinge portion 27 is formed of a metallic hinge component. As shown in FIG. 4, the hinge component has a planar stationary seat 30 and an arm 31. The stationary seat 30 is fixed on the upper surface of the front edge portion of the bottom wall 2b that forms the cover mounting portions 25 by means of rivets, for example.

The arm 31 projects ahead of the bottom wall 2b like a plate from the front edge of the stationary seat 30. The distal end of the arm 31 is U-shaped so that portions 31a branch away crosswise. A pair of shafts 32 protrude individually from the branch portions 31a in the direction (crosswise direction) along the front face of the housing 2.

Figure 5:
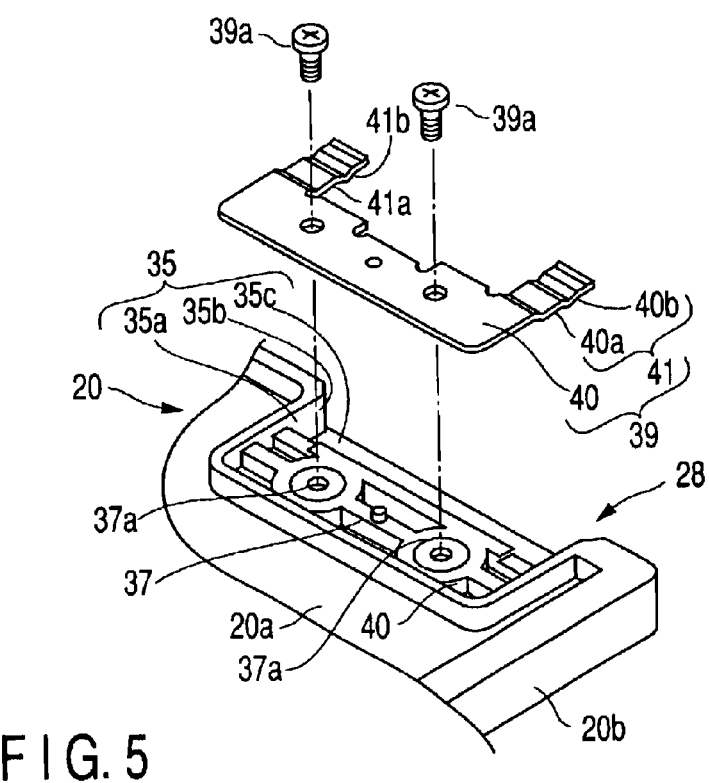
FIG. 5 is an exploded perspective view of the hinge mechanism shown in FIG. 4.

Each second hinge portion 28 is constructed so as to hold the shafts 32 of the first hinge portion 27 by its elastic force. FIGS. 4 and 5 show one of the second hinge portions 28. Since the left- and right-hand second hinge portions 28 have the same construction, FIGS. 4 and 5 show only the right-hand hinge portion 28, and illustration of the left-hand hinge portion 28 is omitted.

As shown in FIGS. 4 and 5, the second hinge portion 28 has a recess 35 that is formed at a corner portion where the inner surface of the lower part of the bezel 20 and its lower end face cross. The recess 35 has an oblong shape that extends in the width direction X. As shown in FIG. 5, the recess 35 has an opening portion 35a (equivalent to a first opening) that opens in the inner surface of the bezel 20. The opening portion 35a has a rectangular shape that allows the shafts 32 and the distal end portion of the arm 31 continuous with the shafts 32 to be set therein.

The recess 35 has an opening portion 35b (equivalent to a second opening) that opens in an end face of the bezel 20. As shown in FIG. 10B, the opening portion 35b has a rectangular shape that allows the shafts 32 and the distal end portion of the arm 31 to be fitted into and removed from the recess 35 through the end face of the bezel 20. A bottom surface 35c (inner surface of the recess) is formed below the opening portion 35a. The distance from the opening portion 35a to the bottom surface 35c is settled depending on the diameter of the shafts 32 and the thickness of the distal end portion of the arm 31.

Figure 9A:
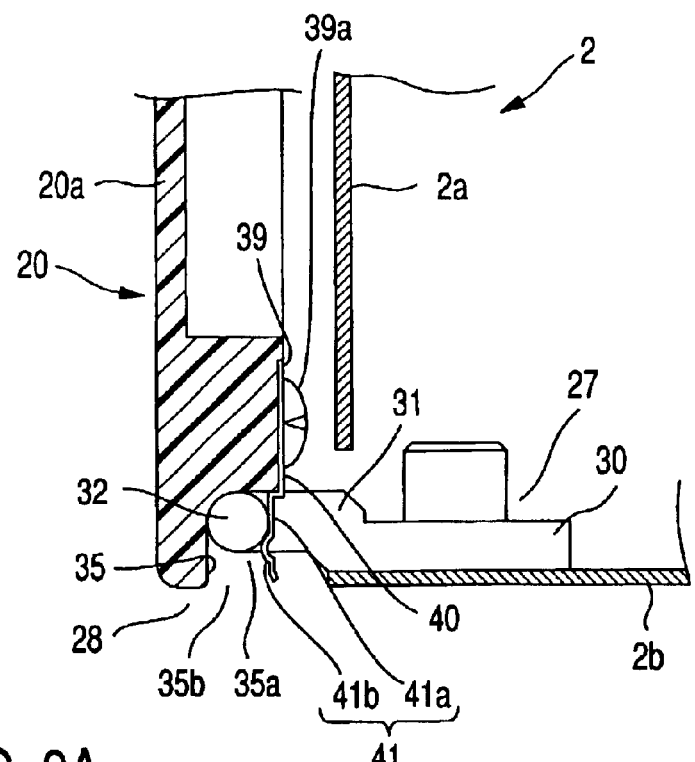
FIG. 9A is a sectional view of the server shown in FIG. 1 with its cover closed.
Figure 9B:
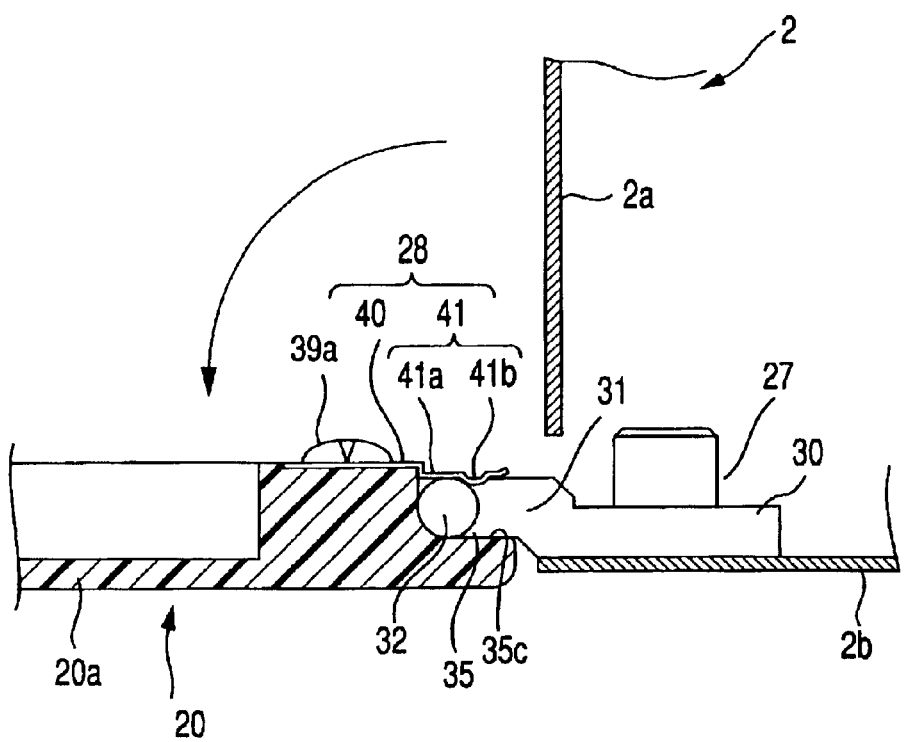
FIG. 9B is a sectional view of the server shown in FIG. 1 with its cover open.

As shown in FIGS. 9A and 9B, the shafts 32 and the distal end portion of the arm 31 continuous with them are set in the recess 35. Thus, the shafts 32 and the distal end portion of the arm 31 can be fitted into and removed from the recess 35 through the opening portion 35a in the inner surface of the bezel 20 or the opening portion 35b in the end face of the bezel 20.

As shown in FIG. 5, a mounting seat 37 is formed on that part of the bezel 20 which adjoins the recess 35. The rib 20b is formed around the mounting seat 37 and the recess 35 so as to bypass them. Tapped holes 37a are formed in the mounting seat 37. A presser plate 39 formed of a plate spring is fixed on the mounting seat 37 by means of screws 39a. The screws 39a are driven into the tapped holes 37a, individually.

As shown in FIG. 5, the presser plate 39 has a stationary seat 40 screwed to the mounting seat 37 and a pair of presser members 41 that extend from the seat 40 toward the opposite sides, left and right, of the recess 35. The presser plate 39 is U-shaped. The presser members 41 are arranged so as to close the opposite sides of the opening portion 35a. The members 41 extend from the opening portion 35a toward the edge portion of the bezel 20.

As shown in FIGS. 9A and 9B, a presser portion 41a is formed on an intermediate portion of each presser member 41 with respect to the longitudinal direction. The presser portion 41a has elasticity such that it can press its corresponding shaft 32 from the inner surface of the bezel 20. The shaft 32 is held in the recess 35 from the inner surface of the bezel 20 or in the depth direction of the recess 35 by means of the elastic force of the presser portion 41a.

A protuberance 41b protrudes from the distal end portion of each presser member 41 that is continuous with the presser portion 41a. The protuberance 41b projects into the recess 35 from the lower end portion of the bezel 20 that adjoins the shaft 32. The protuberance 41b presses its corresponding shaft 32 from the end face of the bezel 20.

In the manner described above, the shafts 32 are held in the recess 35 by means of the parts of the presser plate 39. Thus, the shafts 32 in the recess 35 are supported rockably and removably on the bezel 20.

The closed bezel 20 can be downwardly swung open around the shafts 32. More specifically, the bezel 20 can be rocked around the shafts 32 from a first position where it covers the front face of the main unit 1a, as shown in FIG. 9A, to a second position where it lies flat, as shown in FIG. 9B. In the first position, the bezel 20 closes the slots 10 and 11. In the second position, the bottom surface 35c of the recess 35 abuts the arm 31.

If the bezel 20 is opened, the front face of the main unit 1a and the slots 10 and 11 are exposed. Let it be supposed that the opened front bezel 20 is pulled away from the front face of the main unit 1a. Thereupon, each second hinge portion 28 is subjected to a certain force F1 (shown in FIG. 10A) that acts in a direction perpendicular to the axis of each shaft 32. Accordingly, each shaft 32 pushes up the protuberance 41b and gets out of the recess 35, as shown in FIG. 10B.

Thus, if the tensile force F1 acts from the bezel 20, the shafts 32 are released from restriction by the second hinge portion 28 and can slip out along the inner surface of the bezel 20. If the opened bezel 20 is pulled away from the main unit 1a, it separates from the shafts 32. The shafts 32 remain in the main unit 1a. In this manner, the bezel 20 is disengaged from the main unit 1a. If the shafts 32 are inserted into the recess 35 and supported by means of the protuberances 41b, the bezel 20 is rockably supported on the main unit 1a.

Figure 11A:
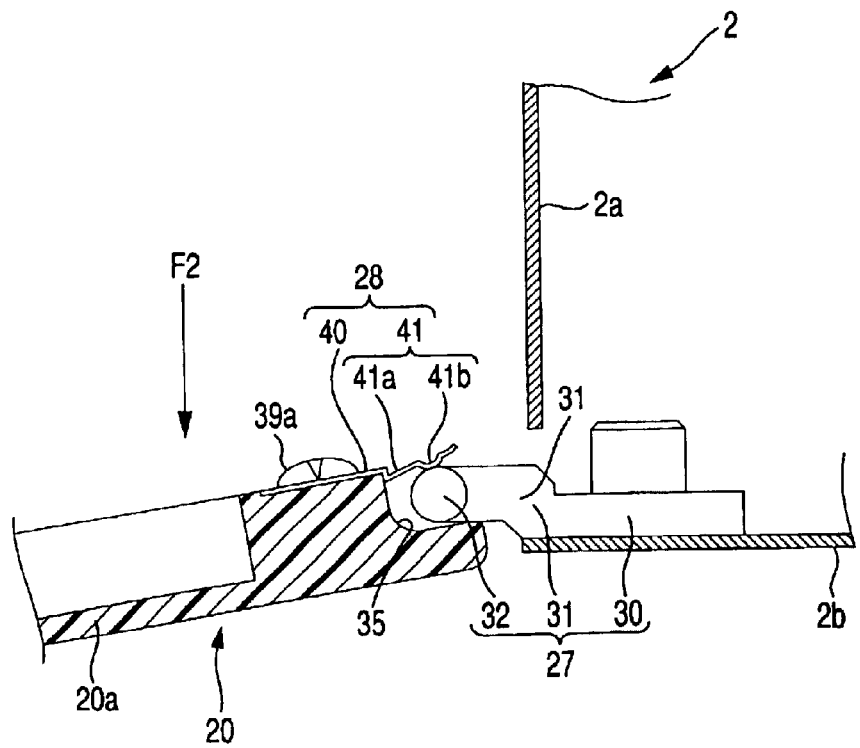
FIG. 11A is a sectional view showing the open cover subjected to an excessive load that urges the cover to open further.
Figure 11B:
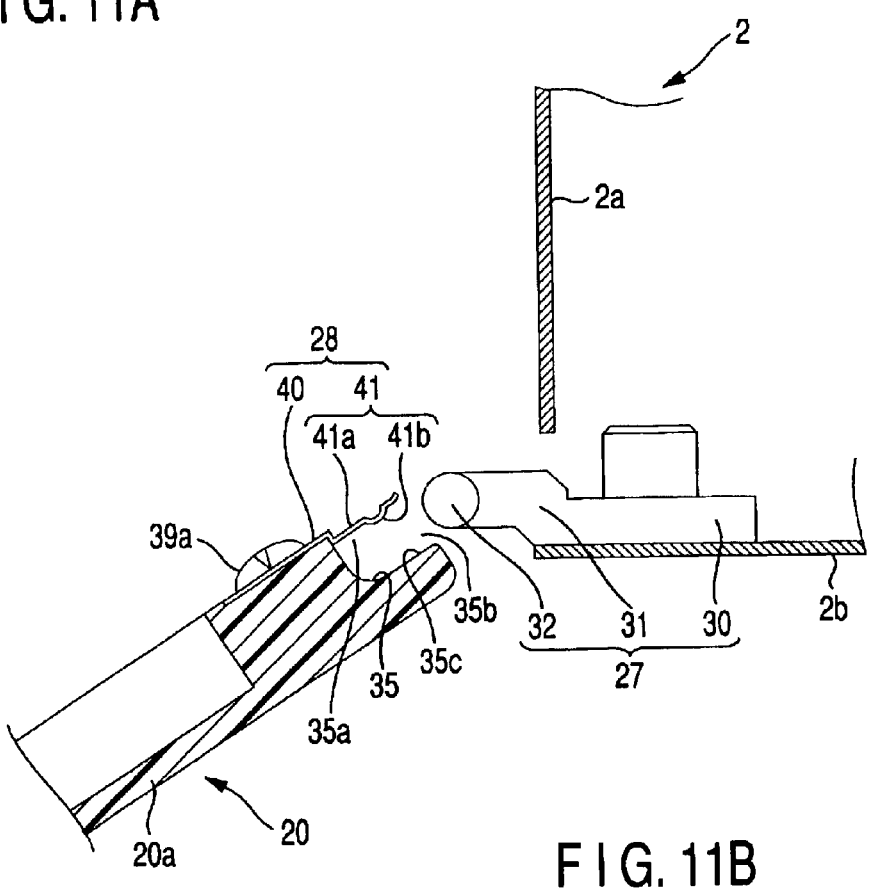
FIG. 11B is a sectional view showing the open cover disengaged from the main unit by means of the excessive load.

Let it be supposed that an excessive load F2 acts on the bezel 20 in the direction to open the bezel 20 further when the bezel 20 is open with the arm 31 abutting against the bottom surface 35c of the recess 35, as shown in FIG. 11A. In this case, the shafts 32 push up the presser members 41, so that they slip out of the recess 35, as shown in FIG. 11B. Thus, if the excessive load F2 acts in the direction to open the opened bezel 20 further, the shafts 32 slip out along the inner surface of the bezel 20 and remain in the main unit 1a.

Thus, the bezel 20 separates from the main unit 1a not only when it is subjected to the tensile force F1 but also when it is subjected to the excessive load F2 in its opening direction.

The closed bezel 20 can be locked to the front face of the main unit 1a by means of a push-type locking portion 45 and a key-type locking portion 50 shown in FIGS. 1 and 2. As shown in FIG. 2, the push-type locking portion 45 has a triangular projection 46 on the inner surface of the bezel 20 and a Y-shaped socket 47 (only partially shown) that is attached to the front face of the front wall 2a for projection and retraction. The projection 46 projects from the inner surface of the bezel 20 on its free-end portion, for example.

The bezel 20 is rocked in the closing direction, and the projection 46 is pushed into the socket 47 by externally pressing that part of the bezel 20 which is fitted with the projection 46. Since the projection 46 then engages the socket 47, the bezel 20 is locked in a position such that it covers the front face of the main unit 1a. If the projection 46 is pushed again into the socket 47, it is disengaged from the projection 46, whereupon the bezel 20 is unlocked.

Figure 6:
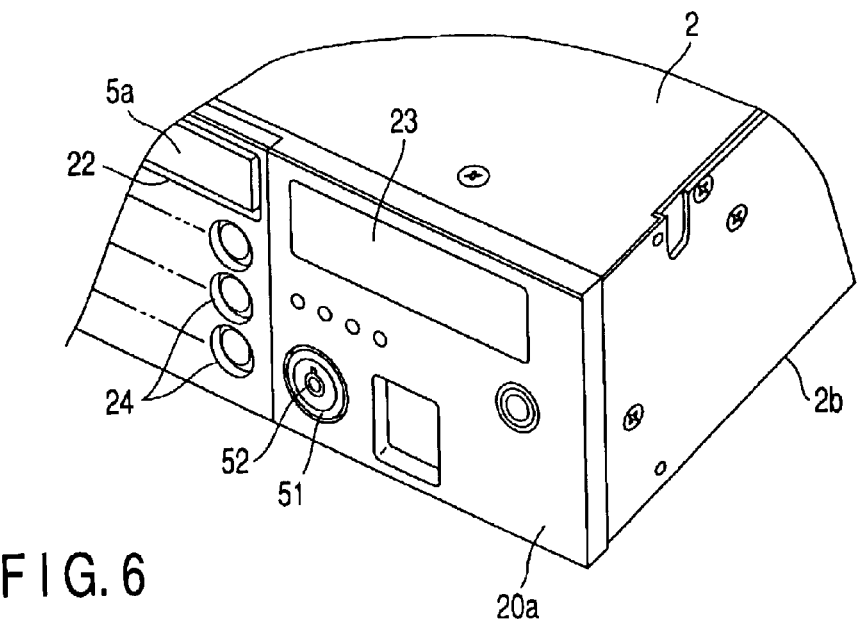
FIG. 6 is a perspective view of a part of the server shown in FIG. 1 with its cover closed.
Figure 7:
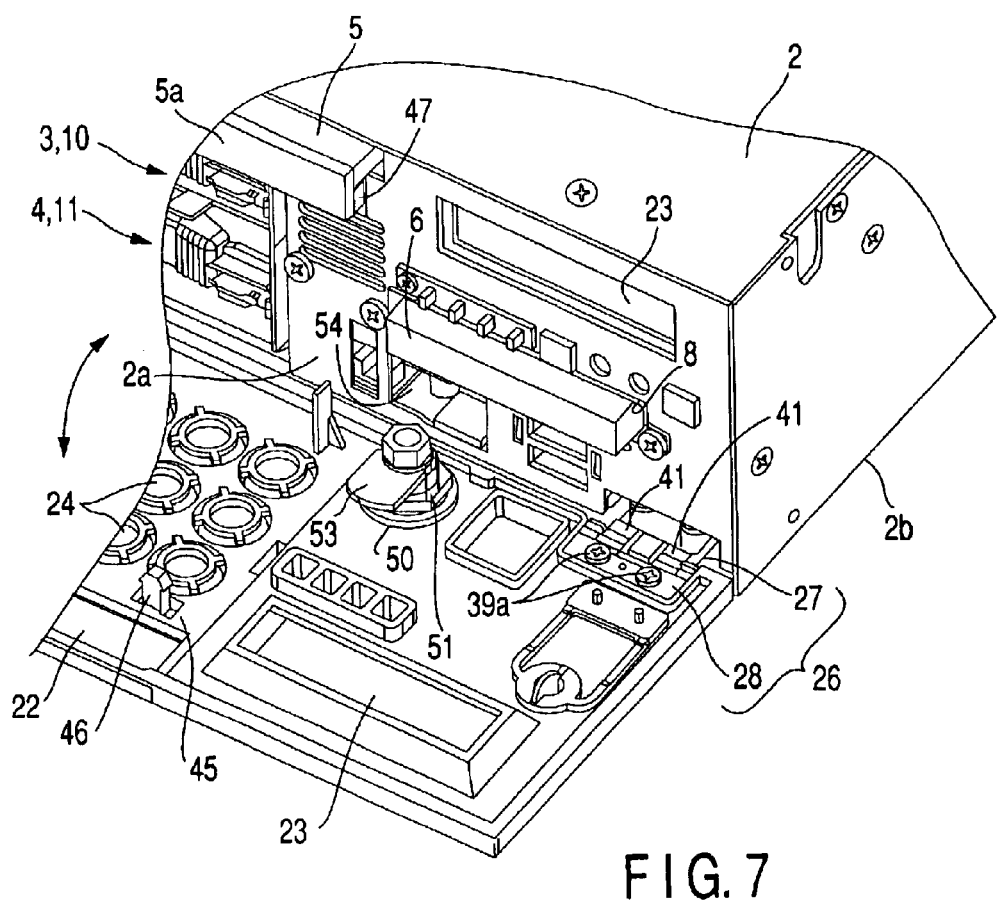
FIG. 7 is a perspective view of a part of the server shown in FIG. 1 with its cover open.
Figure 8:
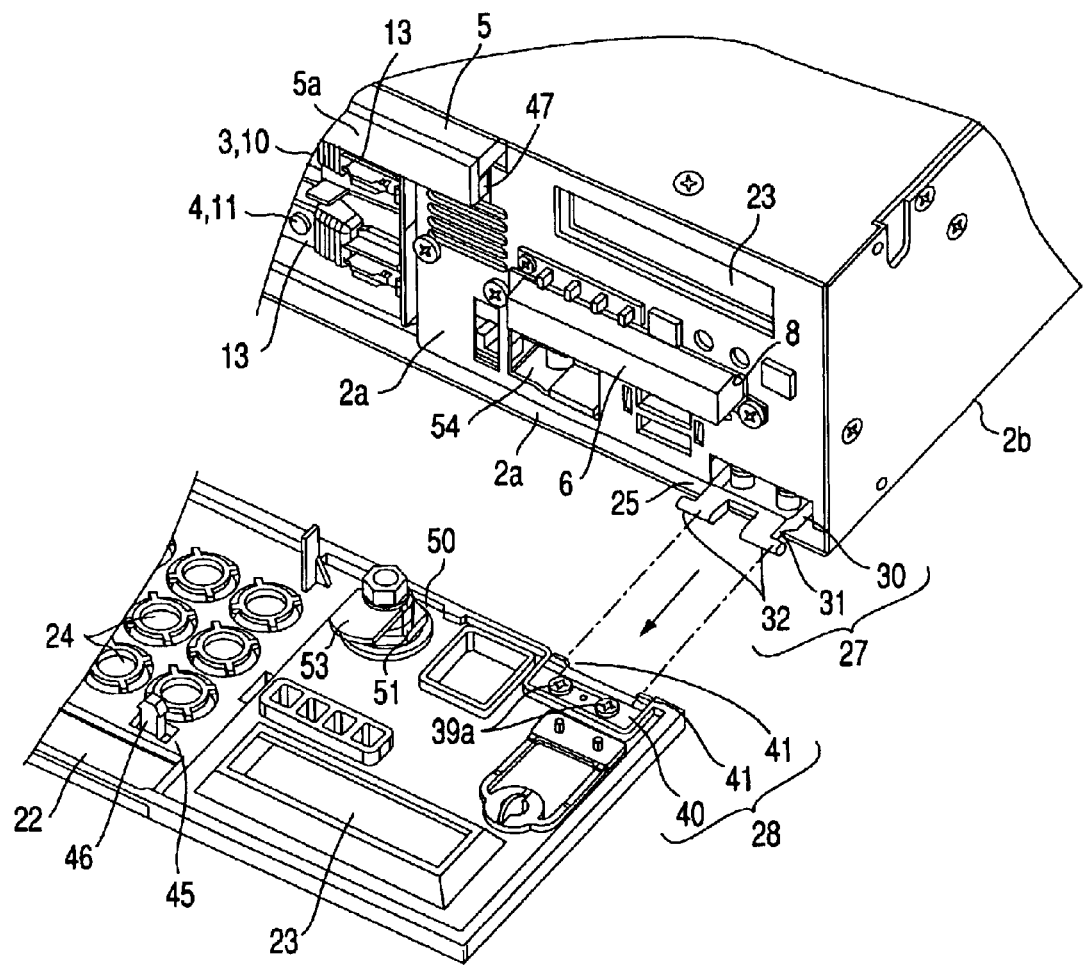
FIG. 8 is a perspective view of a part of the server shown in FIG. 1 with its cover disengaged from the main unit.

As shown in FIGS. 7 and 8, the key-type locking portion 50 has a key cylinder 51 that protrudes from the inner surface of the bezel 20. As shown in FIG. 6, a keyhole 52 that is formed in the front face of the key cylinder 51 faces the outer surface of the bezel 20. The key cylinder 51 is locked or unlocked by turning a key 52a that is inserted in the keyhole 52.

A locking piece 53 is attached to an end portion of a rocking shaft that protrudes from the distal end of the key cylinder 51. The locking piece 53 projects in a direction perpendicular to the axial direction of the cylinder 51. When the key cylinder 51 is in its locked position, the locking piece 53 extends vertically, for example. When the key cylinder 51 is in its unlocked position, the locking piece 53 extends horizontally.

As shown in FIGS. 7 and 8, a locking hole 54 (only partially shown) that serves as a locking portion is formed in the front wall 2a that corresponds to the key cylinder 51. The locking hole 54 has a square shape such that the locking piece 53 can pass through it when in the horizontal position and that the locking piece 53 cannot pass when in the vertical position.

When the key cylinder 51 is in the unlocked position, the bezel 20 is closed and fixed to the main unit 1a by means of the push-type locking portion 45. If the key cylinder 51 is shifted to the locked position by means of the key 52a, thereafter, the locking piece 53 overlaps the opening edge of the locking hole 54, whereupon the bezel 20 is locked. If the key cylinder 51 is shifted to the unlocked position by means of the key 52a, thereafter, the locking piece 53 is allowed to pass through the locking hole 54, and the bezel 20 is unlocked.

The bezel 20 is closed in the manner shown in FIGS. 1, 6 and 9A when the maintenance of the server 1 with the above-described configuration is started. In this case, the bezel 20 is unlocked first. The key cylinder 51 is rocked to the unlocked position by turning the key 52a. Thereupon, the locking piece 53 is shifted to the horizontal position in association with the movement of the key cylinder 51. Thus, the locking piece 53 is allowed to pass through the locking hole 54, that is, the key-type locking portion 50 is unlocked.

Then, that part of the front side of the bezel 20 which is fitted with the projection 46 is pressed. Thereupon, the projection 46 is disengaged from the socket 47, so that the push-type locking portion 45 is also unlocked. Thereafter, the bezel 20 is swung open around the shafts 32 of each hinge mechanism 26, as shown in FIGS. 2, 7 and 9B. The open bezel 20 is positioned in a full-open state as the bottom surface 35c of the recess 35 abuts the lower surface of the arm 31 of each first hinge portion 27.

As shown in FIG. 2, therefore, the front face of the main unit 1a is exposed. Thus, the hard disc drives 3 and 4 that are inserted into the slots 10 and 11 and the electronic devices such as the LAN card 6 inserted into the slot 8 are exposed. In this state, various parts of the front face of the main unit 1a are subjected to maintenance and inspection.

Let it be supposed that the results of the maintenance and inspection require replacement of the lower hard disc drive 4, out of the two hard disc drives 3 and 4, and the LAN card 6, for example.

The hard disc drives 3 and 4 are mounted with high density making the most of the space that ranges from the CD-ROM drive 5 to the bottom wall 2b of the housing 2. When the bezel 20 is on the main unit 1a, therefore, the hard disc drives 3 and 4 interfere with the edge portion of the bezel 20 and the key cylinder 51 that projects from the inner surface of the bezel 20. Thus, the hard disc drives 3 and 4 cannot be drawn out with ease.

Figure 10A:
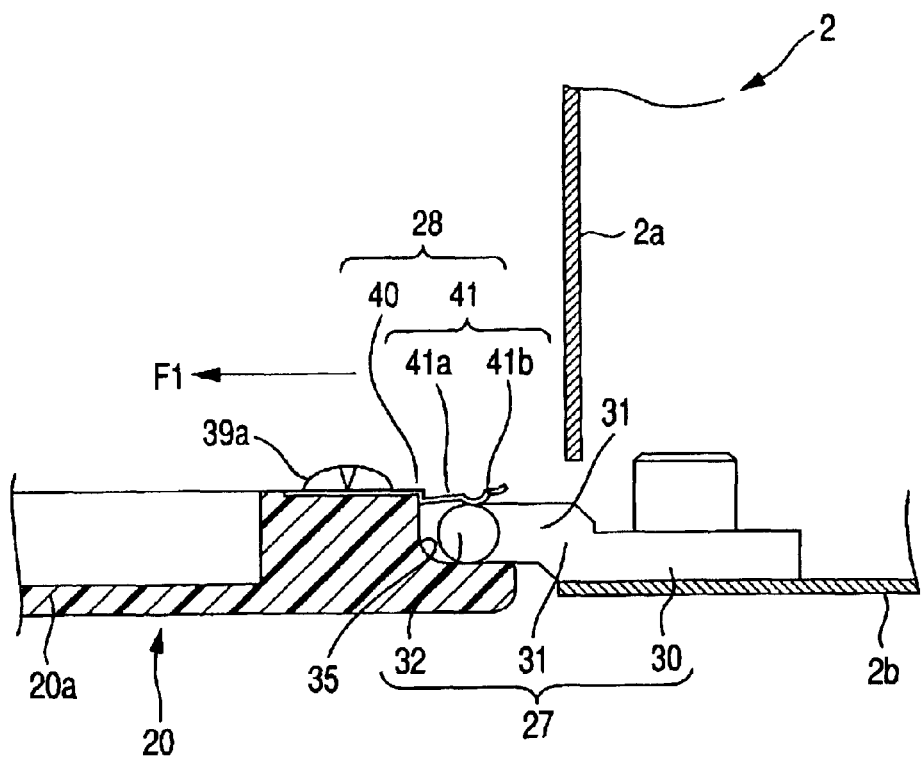
FIG. 10A is a sectional view showing the open cover subjected to a tensile force.
Figure 10B:
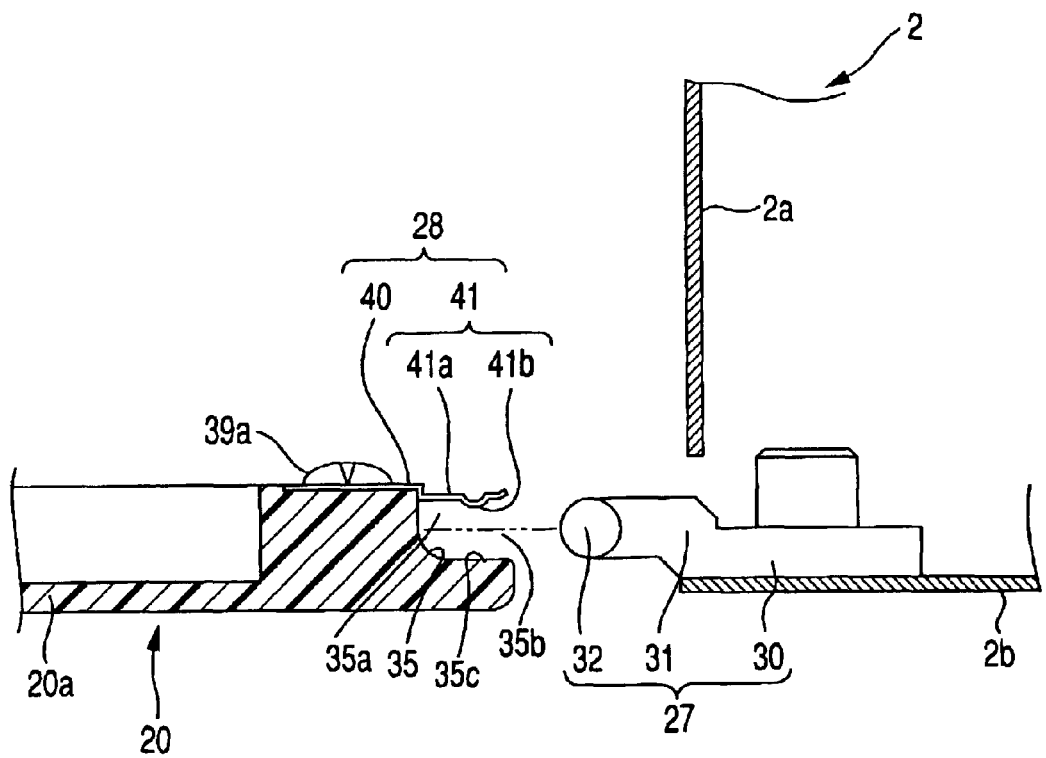
FIG. 10B is a sectional view showing the open cover disengaged from the main unit by means of the tensile force.

In this case, the bezel 20 is pulled away from the front face of the main unit 1a, as indicated arrow F1 in FIG. 10A. This tensile force F1 causes each shaft 32 to push up the protuberance 41b of the presser member 41 as it relatively advances toward the opening portion 35b of the recess 35. Thereupon, the shaft 32 is released from the hold by means of the presser member 41 and slips out of the recess 35, as shown in FIG. 10B.

In this manner, the bezel 20 is disengaged from the front face of the main unit 1a. Thus, in taking out the LAN card 6 and the hard disc drive 4 from the slot 8 and the slot 11, respectively, as shown in FIG. 3, they can be prevented from interfering with the bezel 20. Thereafter, a new LAN card 6 and a new hard disc drive 4 are inserted into the slot 8 and the slot 11, respectively.

When the bezel 20 is reattached to the main unit 1a in this manner, the replacement of the electronic devices is finished. In attaching the bezel 20 to the main unit 1a, each recess 35 is aligned with the shafts 32. In this state, the bezel 20 is pushed in so that the innermost wall surface of the recess 35 abuts against the shafts 32. Thereupon, the shafts 32 are rotatably supported by means of the presser portions 41a and the protuberances 41b.

In the present embodiment, the bezel 20 can be attached to and detached from the main unit 1a. Therefore, the hard disc drive 4 can be mounted near the lower end of the front face of the main unit 1a without being influenced by the bezel 20. In other words, the slot 11 can be formed in close vicinity to the shafts 32 of the hinge mechanisms 26. Thus, the whole panel surface, including the regions near the hinge mechanisms 26 that have not conventionally been utilized, can be used as a space in which the hard disc drives 3 and 4 are mounted.

For the reasons described above, the hard disc drives 3 and 4 can be mounted with high packaging density in the main unit 1a. The projection 46 and the key cylinder 51 protrude from the inner surface of the bezel 20 that is provided with the locking portions such as the push-type locking portion 45 and the key-type locking portion 50.

If there is a possibility of these projections interfering with the hard disc drives 3 and 4, the mounting positions of the disc drives must inevitably be changed in the case of a conventional apparatus. According to the present embodiment, however, the bezel 20 is detachable, so that this problem can be solved. Since the bezel 20 can be handled as a simple, it can be easily replaced with a new one if it is marred or broken.

When the bezel 20 is pulled away from the front face of the main unit 1a, according to the present embodiment, the shafts 32 remain in the main unit 1a, while no traces of the bezel 20 remain in the unit 1a. Therefore, those areas which are situated in close vicinity to the end of the front face of the main unit 1a can be maximally utilized as mounting regions.

If the undue load F2 acts on the open bezel 20, as shown in FIG. 11A, the shafts 32 slip out along the inner surface of the bezel 20, as shown in FIG. 11B. As the bottom surface 35c of the recess 35 pushes up the shafts 32, in this case, the presser member 41 bend upward, so that the shafts 32 slip out of the recess 35. Thus, the shafts 32 remain in the main unit 1a as the bezel 20 comes off the main unit 1a. If the bezel 20 is accidentally subjected to an excessive force in the direction to open it, therefore, it can avoid being damaged.

The bezel 20 can come off the main unit 1a if it is subjected to the excessive force F2 in the direction to open it as well as if it is subjected to the tensile force F1. To attain this, the main unit 1a is provided with the first hinge portions 27 each having the shafts 32, while the bezel 20 is provided with the second hinge portions 28 each having the presser members 41 that are elastically deformable.

Each shaft 32 is rockably held on the inner surface of the bezel 20 by means of the elastic force of the presser member 41. If the bezel 20 is subjected to the tensile force F1 or the excessive force F2 in the direction to open it, the shaft 32 slips out along the inner surface of the bezel 20. Thus, the bezel 20 can be disengaged in two different ways by the hinge portions 27 and 28.

More specifically, each first hinge portion 27 has the arm 31 that projects forward from the main unit 1a and the shafts 32 that jut out sideways from the distal end portion of the arm 31. Each second hinge portion 28 has the recess 35 and the presser plate 39 formed of an elastic material such as a plate spring. The shafts 32 and the distal end portion of the arm 31 are set in the recess 35. The presser plate 39 supports the shafts 32 in the recess 35 for rocking motion in a manner such that the shafts 32 are held from the inner surface (depth direction) and the end face side (horizontal direction) of the bezel 20. Thus, according to the present embodiment, the bezel 20 can be disengaged in the aforesaid two ways by means of each combination of the shafts 32, recess 35, and presser plate 39.

Figure 12:
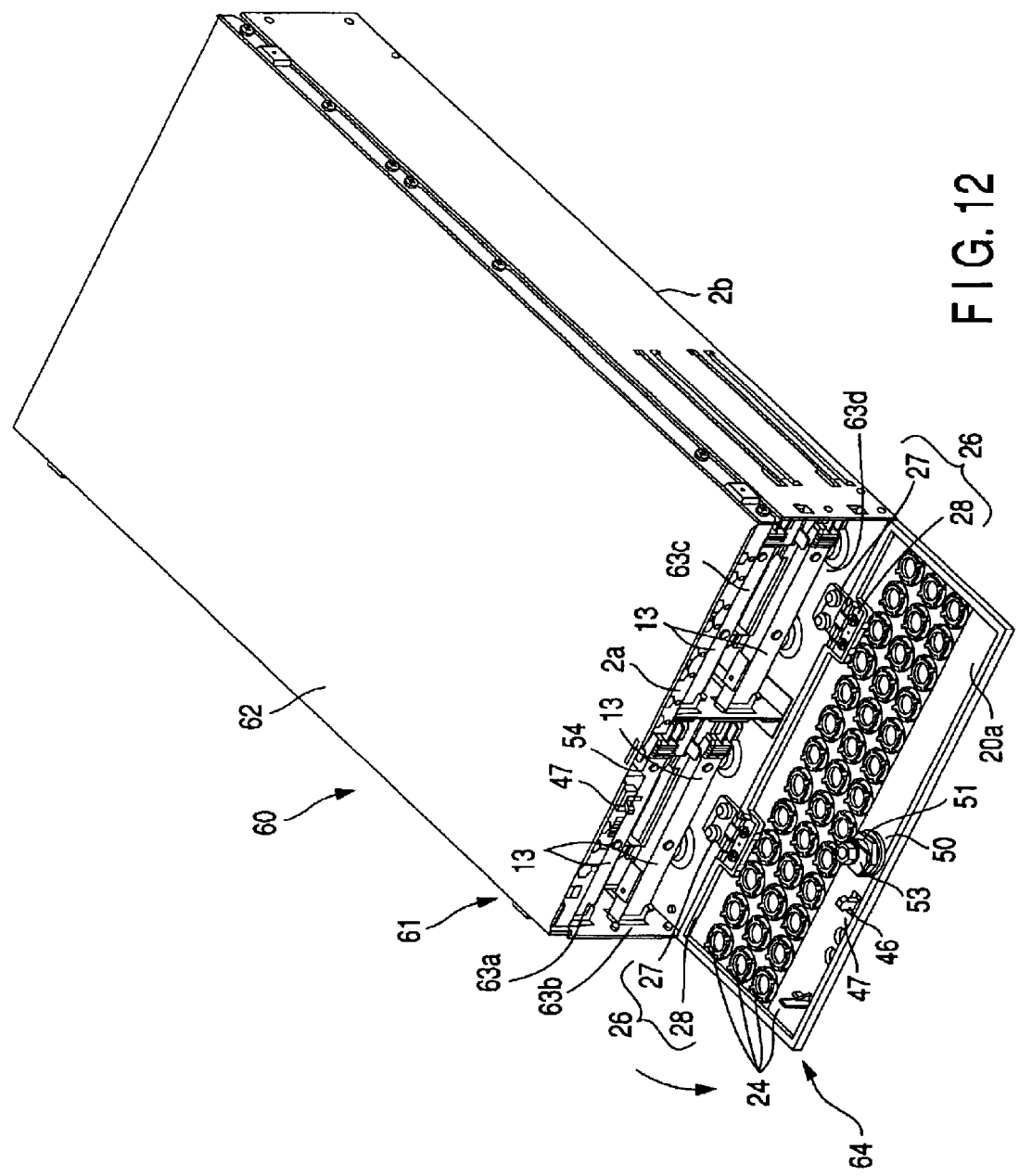
FIG. 12 is a perspective view of an extension unit according to a second embodiment of invention with it cover open.
Figure 13:
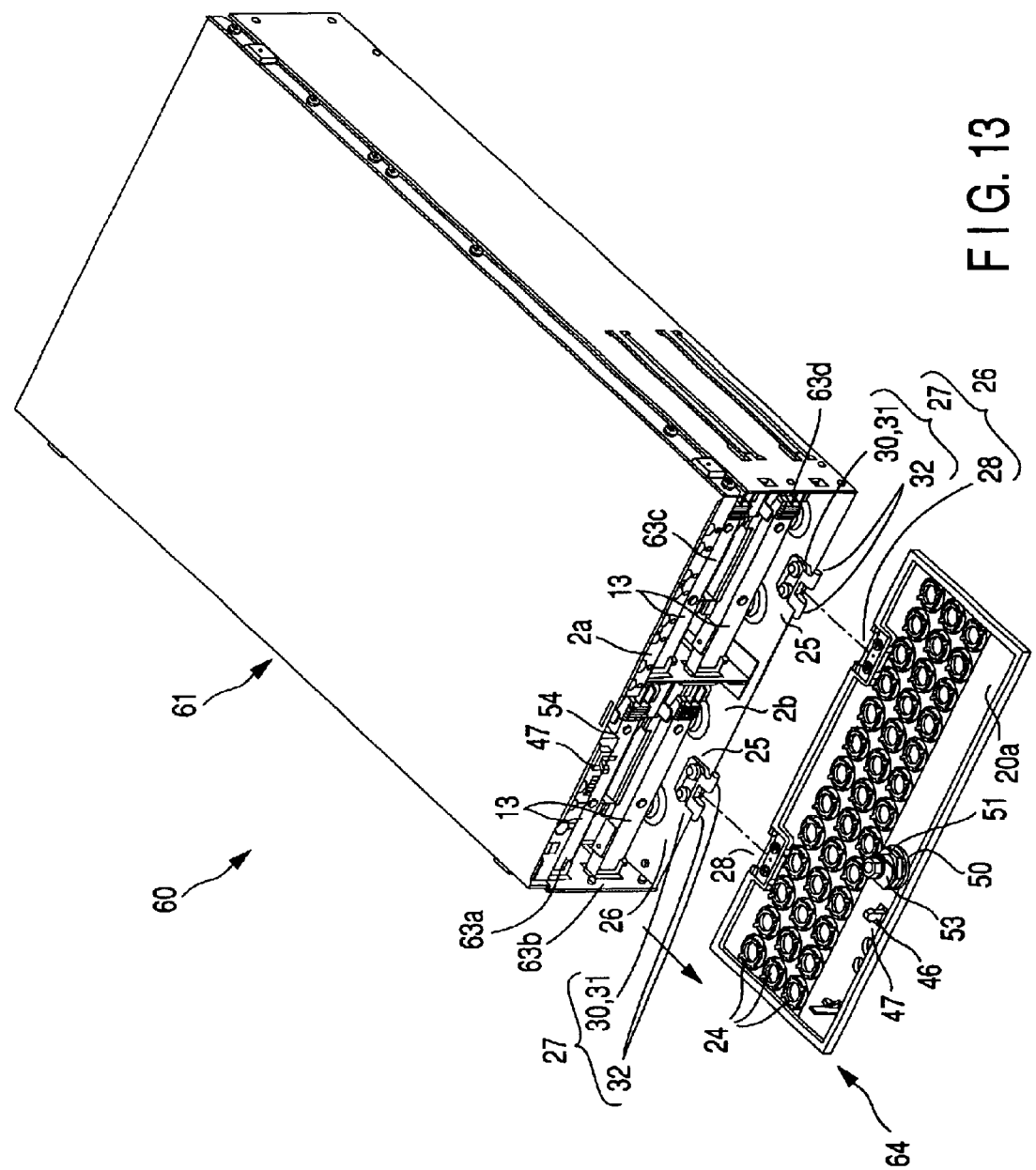
FIG. 13 is a perspective view of the extension unit shown in FIG. 12 with its cover disengaged from its main unit.

FIGS. 12 and 13 show a second embodiment of the present invention. According to the present embodiment, the invention is applied to an extension unit 60 in place of the server of the first embodiment. As shown in FIG. 12, the extension unit 60 comprises four hard disc drives 63a, 63b, 63c and 63d. These hard disc drives 63a to 63d are mounted on the front face of a box-shaped housing 62, two on each of the opposite sides, left and right. A bezel 64 is provided on the front face of the housing 62. The bezel 64 can cover the whole front face of the housing 62. The bezel 64 serves to protect the four mounted hard disc drives 63a to 63d. The bezel 64 is of a swing-down type that can be downwardly swung open by means of hinge mechanisms at its lower end portion.

The bezel 64 of the extension unit 60 uses hinge mechanisms that are constructed in the same manner as those of the first embodiment. Thus, the bezel 64 can be disengaged from a main unit 61 by being pulled in the manner shown in FIG. 13. The bezel 64 can be also disengaged from the main unit 61 by being subjected to a load that urges it to be opened further after it is fully opened.

The extension unit 60 constructed in this manner can produce the same effect of the first embodiment. Since the hinge mechanisms used in the extension unit 60 are identical with those of the first embodiment, like numerals are used to designate like portions of the first embodiment and the second embodiment shown in FIGS. 12 and 13.

The present invention is not limited to the embodiments described above, and various changes and modifications may be effected therein without departing from the scope or spirit of the invention. In each of the embodiments described herein, the server or extension unit that is mounted with the hard disc drives and the LAN card is given as an example of the information processing apparatus. However, the invention may be applied to any other information processing apparatuses that can be mounted with electronic devices.

The cover may not be attached to the front face of the main unit. Rather, it may be attached to a side, back, top or bottom of the main unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   a main unit having a slot formed in a surface and a cover mounting portion formed on the surface and capable of being detachably loaded with an electronic device through the slot;
   a cover provided on the surface of the main unit for covering the slot and having an end portion disposed in the cover mounting portion; and
   a hinge mechanism having a shaft for rockably supporting the end portion of the cover on the cover mounting portion of the main unit, the hinge mechanism detachably connecting the cover and the main unit and allowing the cover to rock around the shaft from a position where the cover closes the slot to position where the slot is opened, the cover being separable from the main unit at the hinge mechanism,
   wherein said hinge mechanism is configured so that the open cover separates from the main unit with the shaft remaining in the main unit when the cover is pulled away from the surface of the main unit,
   wherein said hinge mechanism is configured so that the open cover separates from the main unit with the shaft remaining in the main unit when the cover is further opened for an angle wider than a given angle, and
   wherein said hinge mechanism includes a first hinge portion, attached to the cover mounting portion of the main unit and having the shaft extending along the surface of the main unit, and a second hinge portion, attached to the end portion of the cover, capable of holding the shaft of the first hinge portion for rocking motion by means of the elastic force thereof, and adapted to separate from the shaft when the cover is subjected to a tensile force in a direction perpendicular to an axis of the shaft and/or when the cover is swung open for an angle wider than the given angle.

2. An information processing apparatus according to claim 1, wherein said first hinge portion has an arm projecting forward from the main unit and the shaft extending from a distal end portion of the arm along the surface of the main unit, and said second hinge portion has a recess formed in the inner surface of the cover and capable of receiving the shaft and the distal end portion of the arm, a face adapted to engage the arm when the cover is opened at the given angle, and a presser member attached to the cover and holding the shaft in the recess in conjunction with the end portion of the cover, the presser member having a protuberance on a part thereof projecting into the recess, the protuberance being adapted to support the shaft for rocking motion when the presser member holds the shaft and having elasticity such that the protuberance allows the shaft to slip out of the recess by pushing up the protuberance when the open cover is pulled forward, and that the protuberance allows the shaft to slip out of the recess by bending the presser member when the cover is subjected to a load to open the cover for an angle wider than the given angle.

3. An information processing apparatus according to claim 1, wherein said cover has a locking portion for locking to and unlocking the cover from the surface of the main unit.

4. An information processing apparatus according to claim 2, wherein said presser member is formed of an elastic member.

5. An information processing apparatus according to claim 2, wherein said cover has a locking portion for locking to and unlocking the cover from the surface of the main unit.

6. An information processing apparatus according to claim 4, wherein said presser member is formed of a plate spring member.

* * * * *

UNITED STATES PATENT AND TRADEMARK OFFICE
CERTIFICATE OF CORRECTION

PATENT NO. : 6,788,543 B2 Page 1 of 1
DATED : September 7, 2004
INVENTOR(S) : Yanagida It is certified that error appears in the above-identified patent and that said Letters Patent is hereby corrected as shown below:

Column 9,
Line 52, change "disposed in" to -- disposed on --.

Column 10,
Line 3, change "to position" to -- to a position --.

Signed and Sealed this

Seventh Day of December, 2004

JON W. DUDAS
*Director of the United States Patent and Trademark Office*